US009773517B2

(12) United States Patent
Gao et al.

(10) Patent No.: US 9,773,517 B2
(45) Date of Patent: Sep. 26, 2017

(54) DUAL WRITER HEAD DESIGN

(71) Applicant: Seagate Technology LLC, Cupertino, CA (US)

(72) Inventors: Kaizhong Gao, North Oaks, MN (US); Edward Gage, Lakeville, MN (US); Huaqing Yin, Eden Prairie, MN (US); Yonghua Chen, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/685,417

(22) Filed: Apr. 13, 2015

(65) Prior Publication Data

US 2016/0148629 A1 May 26, 2016

Related U.S. Application Data

(60) Provisional application No. 62/108,897, filed on Jan. 28, 2015, provisional application No. 62/083,696, filed on Nov. 24, 2014, provisional application No. 62/083,732, filed on Nov. 24, 2014.

(51) Int. Cl.
| | |
|---|---|
| *G11B 21/02* | (2006.01) |
| *G11B 5/49* | (2006.01) |
| *G11B 5/31* | (2006.01) |
| *G11B 5/012* | (2006.01) |
| *G11B 5/127* | (2006.01) |
| *G11B 5/48* | (2006.01) |

(52) U.S. Cl.
CPC ............ *G11B 5/4984* (2013.01); *G11B 5/012* (2013.01); *G11B 5/1278* (2013.01); *G11B 5/3116* (2013.01); *G11B 5/4886* (2013.01)

(58) Field of Classification Search
None
See application file for complete search history.

(56) References Cited

U.S. PATENT DOCUMENTS

| | | | |
|---|---|---|---|
| 4,030,130 A | 6/1977 | Smith | |
| 4,152,736 A | 5/1979 | Jansen et al. | |
| 4,298,897 A | 11/1981 | Arter et al. | |
| 4,535,372 A | 8/1985 | Yeakley | |
| 4,622,601 A | 11/1986 | Isozaki et al. | |
| 4,646,168 A | 2/1987 | Sonobe et al. | |
| 4,771,346 A | 9/1988 | Shoji et al. | |
| 4,803,571 A | 2/1989 | Fujioka et al. | |
| 4,853,799 A | 8/1989 | Aikawa | |
| 5,010,430 A * | 4/1991 | Yamada ............... | G11B 5/4886 360/235.4 |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — K. Wong
(74) *Attorney, Agent, or Firm* — Holzer Patel Drennan (57) ABSTRACT

A storage device includes a transducer head with multiple write elements having write poles of different sizes. For example, the transducer head may include two write poles of different width configured to write to a same surface of a storage medium. A controller of the storage device is configured to selectively engage one of the multiple write elements to write data to the storage medium.

17 Claims, 6 Drawing Sheets

(56) References Cited

U.S. PATENT DOCUMENTS

| | | | |
|---|---|---|---|
| 5,285,341 A * | 2/1994 | Suzuki | G11B 5/3103 360/121 |
| 5,402,270 A | 3/1995 | McDonnell et al. | |
| 5,760,993 A | 6/1998 | Purkett | |
| 5,892,634 A | 4/1999 | Ito et al. | |
| 5,912,779 A * | 6/1999 | Llewellyn | G11B 5/012 360/121 |
| 5,978,168 A | 11/1999 | Mathews et al. | |
| 6,052,797 A | 4/2000 | Ofek et al. | |
| 6,104,562 A | 8/2000 | Ottesen et al. | |
| 6,185,063 B1 | 2/2001 | Cameron | |
| 6,710,960 B1 | 3/2004 | Yorimitsu | |
| 6,768,605 B2 | 7/2004 | Yamamoto | |
| 7,130,152 B1 | 10/2006 | Raymond et al. | |
| 7,259,927 B2 * | 8/2007 | Harris | G11B 5/3958 360/31 |
| 7,393,066 B2 | 7/2008 | Dugas et al. | |
| 7,440,222 B2 | 10/2008 | Nakamura et al. | |
| 7,508,619 B2 | 3/2009 | Okamoto et al. | |
| 7,573,682 B2 * | 8/2009 | Pust | G11B 5/3116 360/125.31 |
| 7,872,829 B2 | 1/2011 | Sakai | |
| 7,907,360 B2 | 3/2011 | Mak et al. | |
| 7,957,093 B2 * | 6/2011 | Brand | G11B 5/3136 360/313 |
| 7,965,465 B2 | 6/2011 | Sanvido et al. | |
| 8,023,215 B1 | 9/2011 | Ghaly et al. | |
| 8,139,318 B2 | 3/2012 | Biskeborn | |
| 8,310,777 B2 | 11/2012 | Biskeborn et al. | |
| 8,310,782 B2 | 11/2012 | Song et al. | |
| 8,531,792 B1 | 9/2013 | Burd et al. | |
| 8,531,793 B2 | 9/2013 | Bandic et al. | |
| 8,537,481 B1 | 9/2013 | Bandic | |
| 8,599,510 B1 | 12/2013 | Fallone | |
| 8,693,123 B1 | 4/2014 | Guo et al. | |
| 8,699,159 B1 | 4/2014 | Malina | |
| 8,699,162 B1 | 4/2014 | Grobis et al. | |
| 8,711,517 B2 | 4/2014 | Erden et al. | |
| 8,854,752 B2 | 10/2014 | Jin et al. | |
| 8,867,161 B2 | 10/2014 | Emo et al. | |
| 8,873,178 B2 | 10/2014 | Erden et al. | |
| 8,913,335 B2 | 12/2014 | Coker et al. | |
| 8,917,469 B1 | 12/2014 | Guo et al. | |
| 8,929,186 B1 | 1/2015 | Sharma et al. | |
| 8,976,478 B1 | 3/2015 | Harllee, III et al. | |
| 9,053,712 B1 | 6/2015 | Guo et al. | |
| 9,058,829 B1 * | 6/2015 | Wolf | G11B 5/6064 |
| 9,082,458 B1 | 7/2015 | Tang | |
| 9,087,541 B1 | 7/2015 | Pokharel et al. | |
| 9,099,103 B1 | 8/2015 | Krichevsky | |
| 9,105,302 B1 | 8/2015 | Erden et al. | |
| 9,111,575 B1 | 8/2015 | Zhou et al. | |
| 9,111,578 B1 | 8/2015 | Hassel et al. | |
| 9,129,658 B1 | 9/2015 | Yamamoto | |
| 9,142,232 B2 | 9/2015 | Edelman et al. | |
| 9,142,246 B1 | 9/2015 | Trantham et al. | |
| 9,153,287 B1 | 10/2015 | Hamilton et al. | |
| 9,324,362 B1 | 4/2016 | Gao | |
| 9,396,062 B1 | 7/2016 | Sridhara et al. | |
| 9,418,688 B1 | 8/2016 | Rausch et al. | |
| 2002/0035666 A1 | 3/2002 | Beardsley et al. | |
| 2002/0035704 A1 | 3/2002 | Wilson | |
| 2002/0105867 A1 | 8/2002 | Tamaru et al. | |
| 2003/0214886 A1 | 11/2003 | Sakamoto et al. | |
| 2005/0078399 A1 | 4/2005 | Fung et al. | |
| 2005/0157597 A1 | 7/2005 | Sendur et al. | |
| 2006/0215511 A1 | 9/2006 | Shin et al. | |
| 2007/0047415 A1 | 3/2007 | Chang | |
| 2007/0050593 A1 | 3/2007 | Chen et al. | |
| 2007/0174582 A1 | 7/2007 | Feldman | |
| 2008/0002272 A1 | 1/2008 | Riedel | |
| 2008/0239901 A1 | 10/2008 | Tsunokawa et al. | |
| 2008/0316639 A1 | 12/2008 | Tang et al. | |
| 2009/0244775 A1 | 10/2009 | Ehrlich | |
| 2009/0251821 A1 | 10/2009 | Song et al. | |
| 2010/0014183 A1 | 1/2010 | Aoki et al. | |
| 2010/0027406 A1 | 2/2010 | Krause et al. | |
| 2010/0271727 A1 | 10/2010 | Namkoong et al. | |
| 2010/0321817 A1 | 12/2010 | Aida et al. | |
| 2012/0014013 A1 | 1/2012 | Bandic et al. | |
| 2012/0194946 A1 | 8/2012 | Watanabe et al. | |
| 2013/0148225 A1 | 6/2013 | Coker et al. | |
| 2013/0155826 A1 | 6/2013 | Zhang et al. | |
| 2013/0294207 A1 | 11/2013 | Erden et al. | |
| 2014/0016224 A1 | 1/2014 | Unoki et al. | |
| 2014/0043708 A1 | 2/2014 | Erden et al. | |
| 2014/0055881 A1 | 2/2014 | Zaharris | |
| 2014/0153134 A1 | 6/2014 | Han et al. | |
| 2014/0160589 A1 | 6/2014 | Deki et al. | |
| 2014/0285923 A1 | 9/2014 | Aoki et al. | |
| 2014/0327983 A1 | 11/2014 | Biskeborn et al. | |
| 2015/0178161 A1 | 6/2015 | Burd et al. | |
| 2016/0148630 A1 | 5/2016 | Rausch | |
| 2016/0148635 A1 | 5/2016 | Zhu et al. | |
| 2016/0148636 A1 | 5/2016 | Ma et al. | |
| 2016/0148637 A1 | 5/2016 | Rausch et al. | |
| 2016/0148642 A1 | 5/2016 | Gao | |
| 2016/0148643 A1 | 5/2016 | Gao et al. | |
| 2016/0148644 A1 | 5/2016 | Zhu et al. | |
| 2016/0148645 A1 | 5/2016 | Zhu et al. | |

FOREIGN PATENT DOCUMENTS

| | | |
|---|---|---|
| JP | 02240862 A | 9/1990 |
| WO | 2005-030869 A1 | 4/2005 |

* cited by examiner

DUAL WRITER HEAD DESIGN

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/108,897 entitled "Dual Writer Head Design" and filed on Jan. 28, 2015. Each of these applications is specifically incorporated by reference for all that it discloses or teaches.

BACKGROUND

As requirements for area storage density increase for magnetic media, cell size decreases. A commensurate decrease in the size of a write element is difficult because in many systems, a strong write field is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks. This effect penalizes performance of the system.

Therefore, better designs are desired to increase storage device performance while achieving or improving upon the ADC of existing SMR systems.

SUMMARY

Implementations disclosed herein provide for a transducer head including two write elements with different write pole widths configured to write to a same surface of a storage medium This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
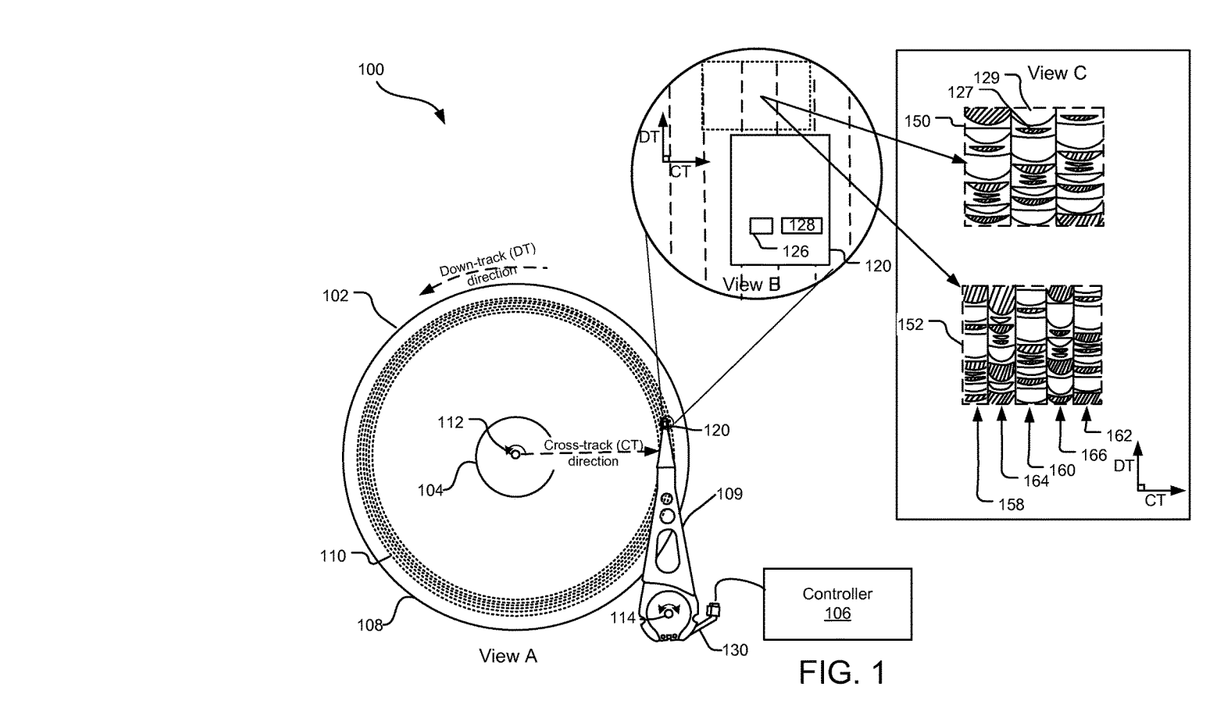
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

Referring to View B, the transducer head assembly 120 includes two different write elements 126 and 128. The write elements 126 and 128 are shown to be in alignment in the cross-track direction; however, other write element configurations are also contemplated. Each of the write elements 126 and 128 includes a write pole (not shown) that converts a series of electrical pulses sent from a controller 106 into a series of magnetic pulses of commensurate magnitude and length. The magnetic pulses selectively magnetize magnetic grains of the rotating magnetic medium 108 as they pass below the pulsating write element 126 or 128.

View C illustrates magnified views 150 and 152 of a same surface portion of the storage medium 108 according to different write methodologies and settings of the storage device 100. Specifically, the magnified views 150 and 152 include a number of magnetically polarized regions, also referred to herein as "data bits," along the data tracks of the storage medium 108. Each of the data bits (e.g., a data bit 127) represents one or more individual data bits of a same state (e.g., 1s or 0s). For example, the data bit 129 is a magnetically polarized region representing multiple bits of a first state (e.g., "000"), while the adjacent data bit 127 is an oppositely polarized region representing one or more bits of a second state (e.g., a single "1"). The data bits in each of the magnified views 150, 152 are not necessarily illustrative of the actual shapes or separations of the bits within an individual system configuration.

The magnified view 150 illustrates magnetic transitions recorded using techniques for conventional magnetic recording (CMR). In the CMR system, all written data tracks are randomly writeable and have a substantially equal written width. A data track is randomly writeable if it can be individually re-written multiple times without causing significant degradation of data on one or more adjacent data tracks. A data track is "significantly degraded" if reading the data track results in a number of read errors in excess of a maximum number of errors that can be corrected by an error correction code (ECC) of the storage device.

The magnified view 152 illustrates magnetic transitions recorded using techniques for interlaced magnetic recording (IMR). Interlaced magnetic recording utilizes alternating data tracks of different written track widths arranged with slightly overlapping edges so that a center-to-center distance between directly adjacent tracks (e.g., the track pitch) is uniform across the surface of the magnetic medium 108.

For example, the magnified view 116 illustrates alternating data tracks of two different written track widths. A series of alternating tracks (e.g., the tracks 158, 160, and 162) have a wider written track width than a series of interlaced data tracks (e.g., 164 and 166). In one implementation, the series of alternating tracks is written with one write element (e.g., the write elements 126 or 128) and the series of interlaced data tracks is written with another write element. Each of the alternating data tracks of wide written width is written before the narrow and directly adjacent data tracks of the series of interlaced data tracks (e.g., the directly adjacent data tracks 164 and 166). For example, the data track 166 is written before the data tracks 162 and 160. Outer edge portions of the data track 166 are overwritten by the data tracks 162 and 160; however, the data track 166 is still readable.

In one implementation, the top tracks (e.g., 164, 166) are of a lower linear density (e.g., kilo bytes per inch, measured in the down-track direction) than the bottom tracks (e.g., 158, 160, and 162). Other IMR implementations utilize interlaced data tracks having more than two different linear densities and/or written track widths. In some implementations, IMR provides for a higher total ADC with a lower observable bit error rate (BER) than conventional magnetic recording systems.

Figure 2:
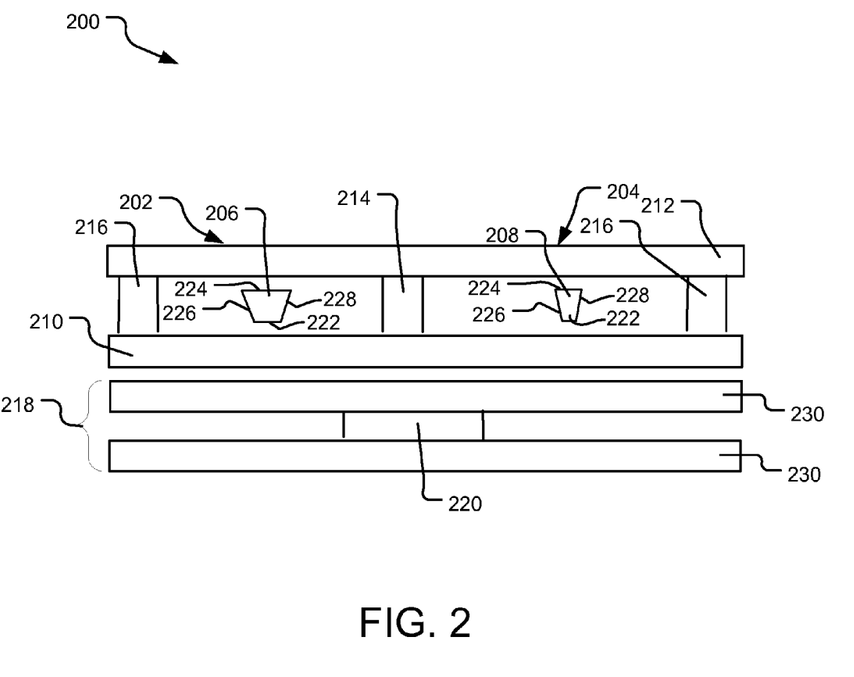
FIG. 2 is a plan view of an example transducer head with dual write elements, viewed from an air-bearing surface.

FIG. 2 is a plan view of an example transducer head 200, viewed from an air-bearing surface (ABS). The transducer head 200 includes first a write element 202 including a main pole with a write pole tip 206, and a second write element 204 including a main pole with a write pole tip 208. Each of the write elements 202 and 204 is symmetrical about a central axis (e.g., the y-axis) when viewed from the ABS, as shown. Further, each of the write elements 202 and 204 includes a write coil (not shown) that may receive a series of electrical pulses from a controller and convert the incoming electrical pulses into a series of outgoing magnetic pulses. The magnetic pulses propagate generally in a direction away from the ABS (e.g., out of the page) and toward an adjacent rotating magnetic medium. The first write element 202 has a first write pole width, while the second write element 204 has a second, different corresponding write pole width.

The transducer head 200 further includes a first return pole 212, a second return pole (or front shield) 210, a shield 214, side shields 216, and a reader assembly 218. The reader assembly 218 includes a read sensor element 220 positioned between a pair of reader shields 230. In the illustrated implementation, one of the reader shields 230 is positioned adjacent to and substantially parallel with the first return pole 210, and the read sensor element 220 is substantially aligned with the shield 214, between the first and second writers with write pole tips 206 and 208.

A perimeter of the write pole tip 206 is defined by a leading edge 222, a trailing edge 224, and two sidewalls 226 and 228. The perimeter of the write pole tip 208 is slightly larger than the write pole tip 206. Like the write pole tip 206, the write pole tip 208 has a perimeter defined by a leading edge 222, a trailing edge 224, and two sidewalls 226 and 228. Although other shapes are contemplated, the write pole tips 206 and 208 are trapezoidal in shape. In one implementation, at least one of the write pole tips 206 and 208 is triangular in shape. For example, the write pole tip 206 may be trapezoidal, while the write pole tip 208 is triangular. It should be understood that the specific features of the transducer head 200 are not drawn to scale.

The first return pole 210 and the second return pole 212 are positioned adjacent to the respective leading and trailing edges of the write pole tips 206 and 208 and separated by an electrically insulating material surrounding each of the write pole tips 206 and 208. The first return pole 212 can be coupled to a yoke (not shown) of each of the write elements 202 and 204 and electrically connected, through the yokes, with the main poles of the write elements 202 and 204. The second return pole 210 can also be coupled to a yoke of each of the write elements 202 and 204 and electrically connected with the main poles of the write elements 202 and 204. In the illustrated configuration, the first and second return poles 206 and 208 are shared by both the first write element 202 and the second write element 204, which operate independently of one another and non-simultaneously.

The shield 214 is positioned in between the write pole tip 206 and the write pole tip 208 and is connected between the first and second return poles 210 and 212. The shield 214 may be electrically connected to a main pole of one of the write elements 202 and 204, and functions to magnetically decouple the first write pole tip 206 from the second write pole tip 208. In operation, the shield 214 and the first and second write pole tips 206 and 208 are electrically isolated from a write current which flows through a write coil (not shown) to generate a series of magnetic pulses.

Figure 3:
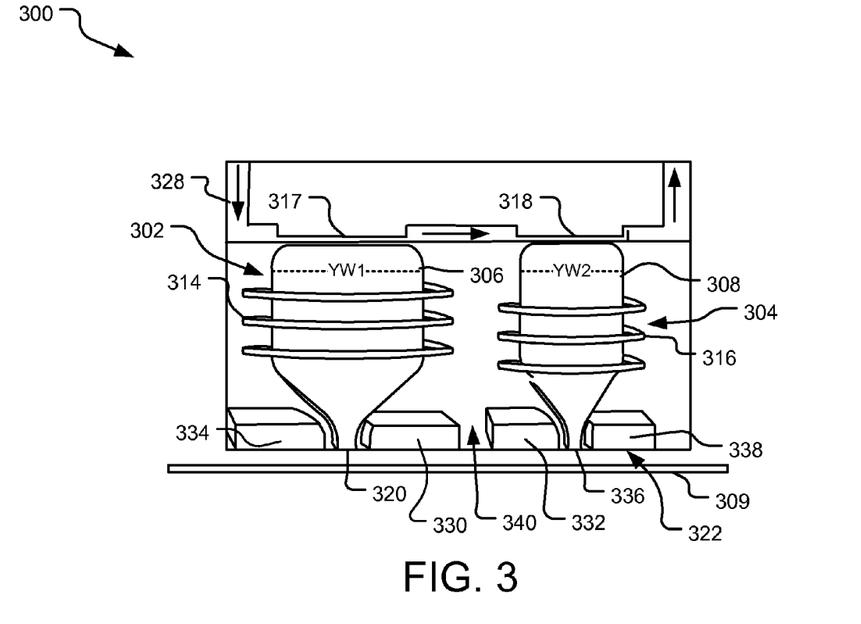
FIG. 3 illustrates a cross-sectional view of another example transducer head including two write elements and with different write pole widths.

FIG. 3 illustrates a cross-sectional view of another transducer head 200 including two write elements 302 and 304. The illustrated cross-section is substantially perpendicular to an ABS 322 of the transducer head 300 facing a rotating magnetic medium 309. The transducer head 300 includes two write elements 302 and 304. Each of the write elements 302 and 304 includes a main pole portion 306 and 308 that includes a main pole element coupled to a yoke (not shown). Write coils 310 and 312 each encircle a corresponding main pole portion 306 or 308.

Each of the write elements 302 and 304 has a different write pole width. As used herein, the term "write pole width" refers to a width of a write pole tip. For instance, the write element 302 has a write pole tip 320 with a first write pole width (e.g., an x-direction width), and the write element 304 has a write pole tip 336 of a second different (e.g., smaller) write pole width. A yoke width YW1 of the first write element 302 is greater than a corresponding yoke width YW2 with of the second write element 304.

As a result of the different dimensions of the write elements 302 and 304, the write element 302 generates magnetic write pulses of larger magnitude than the write element 304. In other words, the write element 302 has a greater write width than the write element 304. As used herein, the term "write width" refers to a size of an area on the magnetic media 309 that may be reversed in polarity by a stationary write element (e.g., 302 or 304) when the magnetic media 309 is also stationary. For instance, the write element 302 generates a write pulse having a first write width and the write element 304 generates a write pulse having a write pulse of a second, smaller write width.

The write coils 310 and 312 are shown to each include three turns about the associated write pole 306 or 308. In other implementations, the write coils 310 and 312 may include a number of turns greater or fewer than three. In some implementations, the write coils 310 and 312 include an unequal number of turns.

In the illustrated implementation, the transducer head 300 includes a heat element 328 positioned adjacent to the write poles 306 and 308 and on a side of the write poles 306 and 308 that is opposite to the write pole tips 320 and 336. The heat element 328 includes two reduced diameter portions 317 and 318. When preparing to write data with one of the write elements 302 or 304, a controller of the transducer head 300 directs a current through the heat element 328 (e.g., in the direction of the arrows indicated in FIG. 3). Responsive to the current flow, the reduced diameter portions 317 and 318 have a larger resistance than the rest of the heat element 328 and therefore heat up more than the rest of the heat element 328. This localized heating causes the write poles 306 and 308 to thermally expand and protrude in a direction away from an ABS 322 of the transducer head 300 and toward a rotating magnetic medium 309.

In operation, a write current is directed through one of two write coils 314 or 316. The write current further energizes the corresponding write pole 306 or 308 and thereby enhances thermal protrusion of the corresponding write pole portion 306 or 308 toward the rotating magnetic medium 309. Thus, the selected write pole portion 306 or 308 is thermally protruded from the transducer head 300 by a combination of heat emanating from the heat element 328 and thermal energy supplied by current flowing through the corresponding write coil 314 or 316. In one implementation, the heat element 328 is separated from the ABS of the transducer head 300 by a distance of less than about 20 microns. This may be true, for example, when the write pole tips 320 and 336 each have an x-direction width of at or greater than about 10 microns.

Inner side shields 330 and 332 function to decouple the write pole tips 20 and 326 from magnetic interferences while outer side shields 334 and 338 function to block external magnetic fields from affecting a write field generated by either of the write element 306 and 308. A gap 340 functions to magnetically isolate the inner side shield 330 from the inner side shield 332. In one implementation, the gap 340 is between about 10 and 100 microns and a separation between of the write elements 306 and 308 on the transducer head 300 is between about 20 microns and 150 microns.

In another implementation, the transducer head 300 does not include the gap 340 and the inner side shields 330 and 332 are interconnected as a single unit. For example, the write elements 302 and 304 may be specifically engineered so that there is no magnetic interference between the first write element 302 and the second write element 304. In this case, there are no concerns limiting the proximity of the write pole portions 306 and 308. Separation between the first write pole 306 and the second write pole 308 may be on the order of approximately 20-150 microns.

In one implementation, the write coils 310 and 312 share a common electrical lead (not shown). In other implementations, the write coils 310 and 312 are integrated into separate electrical circuits.

Figure 4:
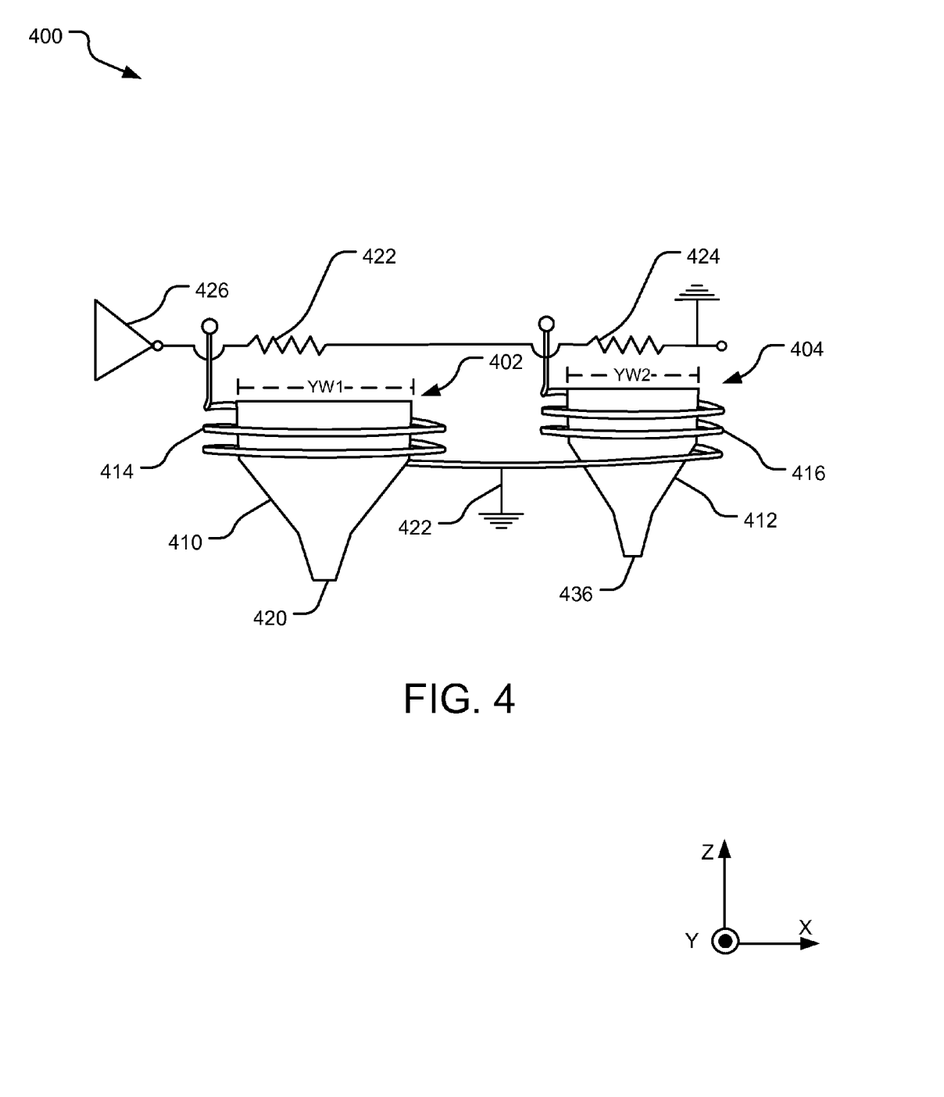
FIG. 4 illustrates an example schematic including two write elements on a same transducer head.

FIG. 4 illustrates a schematic 400 of two independently operable write elements 402 and 404 on a same transducer head. The write elements 402, 404 each include a main pole portion 410, 412 encompassed by turns of a corresponding write coil 414 or 416, respectively. Dimensions of the write element 402 vary from corresponding dimensions of the write element 404 so that the write element 404 has a larger write width than the write width of the write element 402.

Specifically, the main pole portion 410 has a greater yoke width YW1 than a corresponding yoke with YW2 of the main pole portion 412. In addition, the write element 402 has a greater write pole width (e.g., x-direction width of pole tip 420) than a write pole width of the write element 404 (e.g., x-direction width of pole tip 436).

The write coils 414 and 416 are each electrically connected to a common ground 422. Thus, a controller of a storage device can selectively run current through either one of the write coils 414 or 416 independent of the other write coil.

In addition, the transducer head includes a heat element 418 including a series of resistive heaters 422 and 424 and a heater driver 426. Each of the resistive heaters 422 and 424 is positioned adjacent to one of the write elements 402 or 404. When current flows through the heat resistive heat elements 422 and 424, localized heating causes a corresponding protrusion of the write elements 402 and 404 in a direction away from an ABS of the transducer head.

When a write current runs through one of the write coils 414 or 416, the current enhances a thermal protrusion of the associated write element 402 or 404 at the ABS. Thus, the selected write element 402 or 404 is thermally protruded from the transducer head by a combination of heat emanating from the heat element 414 and thermal energy supplied by current flowing through the corresponding write coil 414 or 416.

Figure 5:
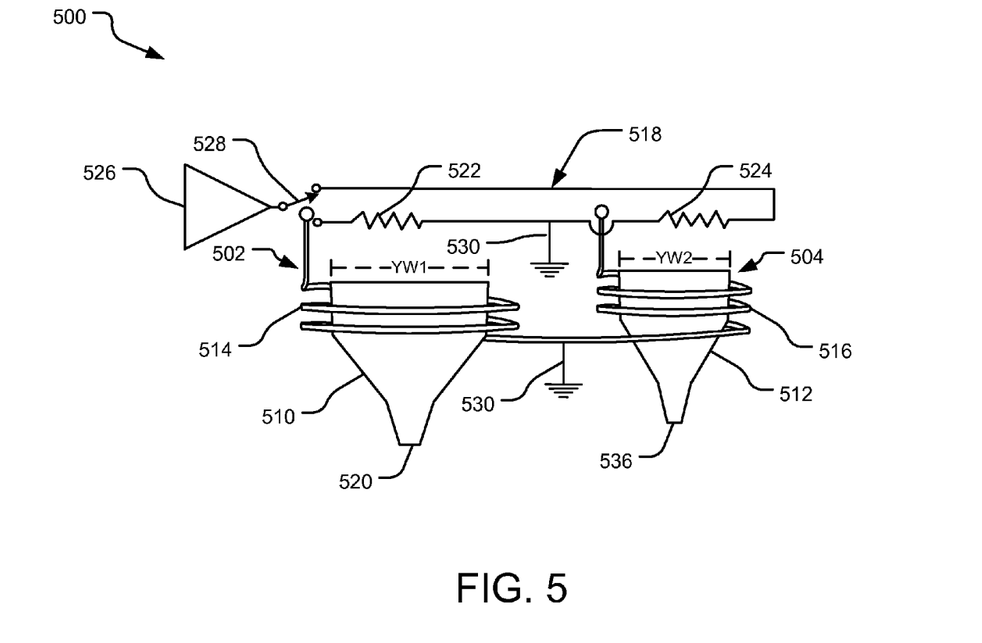
FIG. 5 illustrates another example schematic including two write elements on a same transducer head.

FIG. 5 illustrates a schematic 500 including two write elements 504 and 506 on a same transducer head. The write elements 502, 504 each include a main pole portion 510, 512 encompassed by turns of a corresponding write coil 514 and 516, respectively. Dimensions of the write element 502 vary from corresponding dimensions of the write element 504 so that the write element 504 has a larger write width than the write width of the write element 502. Specifically, the main pole portion 510 has a greater yoke width YW1 than a corresponding yoke width YW2 of the main pole portion 512. Further, the write element 502 has a greater write pole width (e.g., x-direction width of pole tip 520) than a write pole width of the write element 504 (e.g., the x-direction width of pole tip 536).

The write coils are each electrically connected to a common ground 530. Thus, a controller of a storage device can selectively run current through either of the write coils (514 or 516) independent of the other write coil. For example, the controller may selectively direct current through one of two current paths via a two-way switch (not shown). In another implementation, the write coils 514 and 516 are integrated into different electrical circuits and therefore do not share an electrical lead.

In addition, the schematic 500 includes a heat element 518 including independently controllable first and second resistive heaters 522 and 524. The first resistive heater 522 is positioned adjacent to the first write element 506 and is electrically connected between a first pole of a two-way switch 528 and a common ground 530. The resistive heater 524 is positioned adjacent to the second write element 508 and is electrically connected between a second pole of the two-way switch 528 and the common ground 530.

When current flows through the heat resistive heat elements 522 and 524, localized heating causes thermal protrusion of the corresponding write element 506 or 508 away from an ABS of the transducer head and toward a rotating magnetic medium (not shown). When a write current flows through one of the write coils 514 or 516, the current enhances the thermal protrusion of the corresponding write element 506 or 608 toward the rotating medium.

Figure 6:
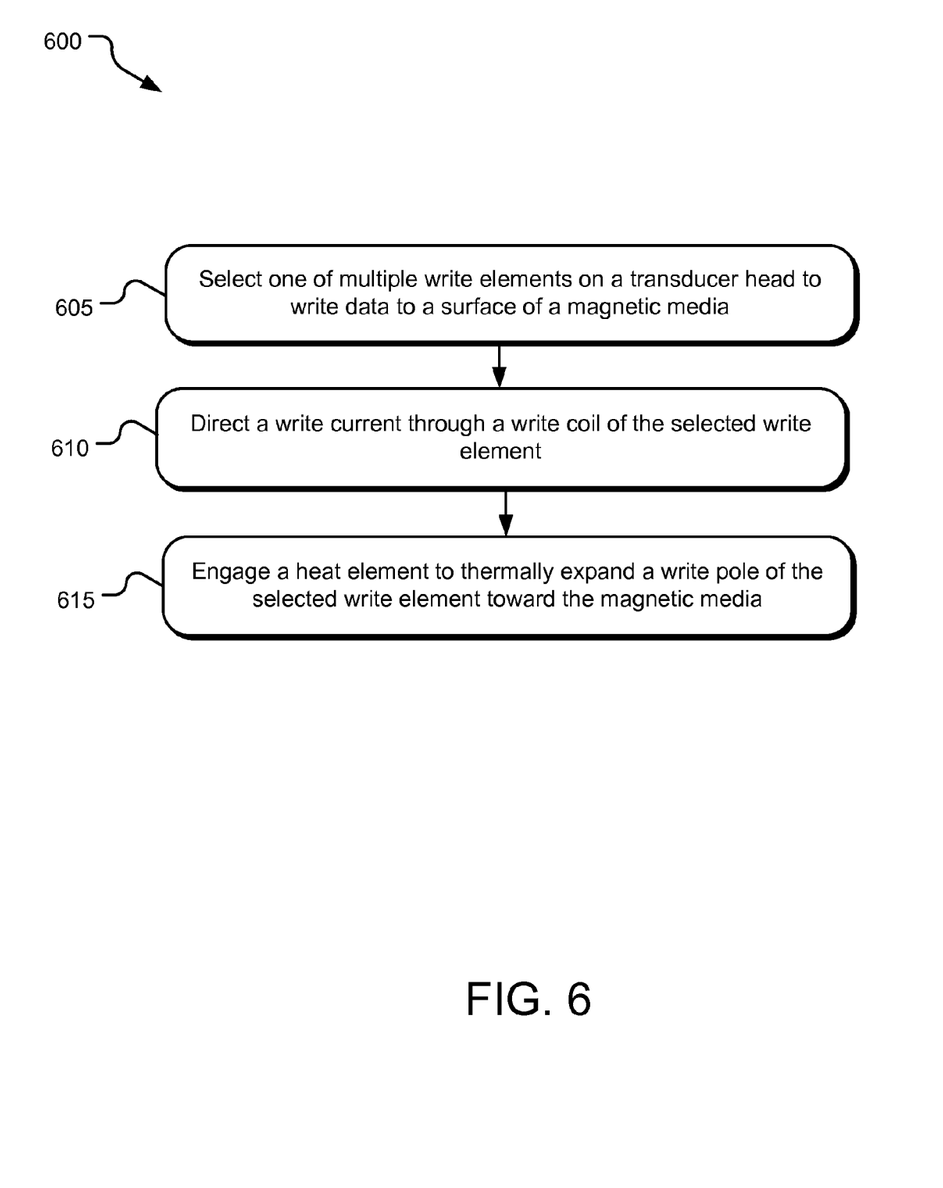
FIG. 6 illustrates example operations for selectively writing data to a surface of a storage medium with one of two or more write elements on a transducer head

FIG. 6 illustrates example operations 600 for selectively writing data to a surface of a storage medium with one of two or more write elements on a transducer head. A selecting operation 605 selects one of multiple write elements to write data responsive to receipt of a write command. Selection between the multiple write elements may be based on, for example, a target address of incoming data provided by a storage device controller or a host computer.

A directing operation 610 directs a write current through a write coil of the selected write element. In one implementation, two or more write elements on a transducer head share a common lead. For example, two write elements may be electrically connected to the same ground.

A heating operation 615 causes a heat element to thermally expand the selected write element at an ABS toward an adjacent rotating magnetic medium. The heating operation 615 may heat one or more of the multiple write elements, depending on the implementation. For example, the heat operation 615 may flow current through exclusively one of multiple localized heat elements, such as two resistors separated by a common ground. Alternatively, the heat operation 615 may simultaneously flow current through multiple localized heat elements causing substantially equal and simultaneous heating of two or more of the multiple write elements.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
  a transducer head including:
    two write elements with different write pole widths configured to write to a same surface of a storage medium, the two write elements each including a write coil; and
    a common electrical ground that is electrically coupled to the write coil of each one of the two write elements; and
    a controller configured to operate a first of the two write elements to write data at a first linear density and configured to operate a second of the two write elements to write data at a second different linear density.

2. The storage device of claim 1, wherein the transducer head further includes two heat elements sharing a common lead, each of the heat elements providing heat to a different one of the two write elements.

3. The storage device of claim 2, wherein the two write elements are each symmetric about a central axis when viewed from an air bearing surface (ABS) of a storage medium.

4. The storage device of claim 1, wherein the write elements operate independent of one another.

5. The storage device of claim 1, wherein the transducer head further comprises a single heat element configured to simultaneously heat both of the write elements.

6. The storage device of claim 1,
  wherein the controller is configured to write data a first set of alternating data tracks with a first one of the two write elements and configured to write data to a second set of alternating data tracks with a second one of the two write elements.

7. The storage device of claim 1, wherein the two write elements are separated by a distance of less than about 50 microns and greater than about 10 microns.

8. A method comprising:
  selecting one of two write elements on a transducer head to write data to a magnetic media, the two write elements having different write pole widths and each including a corresponding write coil attached to a common electrical ground; and
  writing data at a first linear density with a first of the two write elements and writing data at a second different linear density with a second one the two write elements.

9. The method of claim 8, wherein the transducer head further comprises two heat elements sharing a common lead, the heat elements each configured to heat a different one of the two write elements.

10. The method of claim 9, wherein the heat elements are connected in series.

11. The method of claim 8, wherein the write elements operate independent of one another.

12. The method of claim 8, wherein the transducer head further comprises a single heat element configured to simultaneously heat each of the two write elements.

13. The method of claim 8, further comprising:
  writing data a first set of alternating data tracks with a first one of the two write elements and writing data to a second set of alternating data tracks with a second one of the two write elements.

14. The method of claim 8, wherein the two write poles are separated by a distance of less than about 50 microns and greater than about 10 microns.

15. A storage device comprising:
  a transducer head with two write elements having different write pole widths and each including a corresponding write coil attached to a common electrical ground; and
  a controller to selectively engage one of the two write elements to record data of a write operation and to operate a first of the two write elements to write data at a first linear density and configured to operate a second of the two write elements to write data at a second different linear density.

16. The storage device of claim 15, further comprising:
  a heat element configured to simultaneously heat and thermally expand each of the two write poles toward an air-bearing surface (ABS).

17. The storage device of claim 16, wherein the heat element further comprises at least two resistors connected in series.

* * * * *